United States Patent [19]

Tran et al.

[11] Patent Number: 5,835,744

[45] Date of Patent: Nov. 10, 1998

[54] MICROPROCESSOR CONFIGURED TO SWAP OPERANDS IN ORDER TO MINIMIZE DEPENDENCY CHECKING LOGIC

[75] Inventors: Thang M. Tran; David B. Witt; William M. Johnson, all of Austin, Tex.

[73] Assignee: Advanced Micro Devices, Inc., Sunnyvale, Calif.

[21] Appl. No.: 561,030

[22] Filed: Nov. 20, 1995

[51] Int. Cl.[6] .......................................... G06F 9/30
[52] U.S. Cl. ............................. 395/384; 711/214
[58] Field of Search ...................... 395/421.04, 308, 395/800, 384, 581, 496; 711/214

[56] References Cited

U.S. PATENT DOCUMENTS

| | | | |
|---|---|---|---|
| 4,044,338 | 8/1977 | Wolf | 365/49 |
| 4,453,212 | 6/1984 | Gaither et al. | 711/2 |
| 4,742,453 | 5/1988 | Shibuya | 395/581 |
| 4,807,115 | 2/1989 | Torng | 395/391 |
| 4,858,105 | 8/1989 | Kuriyama et al. | 395/582 |
| 4,928,223 | 5/1990 | Dao et al. | 395/597 |
| 5,053,631 | 10/1991 | Perlman et al. | 364/748.14 |
| 5,058,048 | 10/1991 | Gupta et al. | 364/748.14 |
| 5,129,067 | 7/1992 | Johnson et al. | 395/389 |
| 5,136,697 | 8/1992 | Johnson | 395/586 |
| 5,226,126 | 7/1993 | McFarland et al. | 395/394 |
| 5,226,130 | 7/1993 | Favor et al. | 395/585 |
| 5,517,657 | 5/1996 | Rodgers et al. | 395/496 |
| 5,649,225 | 7/1997 | White et al. | 395/800 |

FOREIGN PATENT DOCUMENTS

| | | |
|---|---|---|
| 0259095 | 3/1988 | European Pat. Off. . |
| 0381471 | 8/1990 | European Pat. Off. . |
| 0459232 | 12/1991 | European Pat. Off. . |
| 0651322A1 | 3/1995 | European Pat. Off. . |
| 2263985 | 8/1993 | United Kingdom . |
| 2263987 | 8/1993 | United Kingdom . |
| 2281422 | 3/1995 | United Kingdom . |

OTHER PUBLICATIONS

Intel, "Chapter 2: Microprocessor Architecture Overview," pp. 2–1 through 2–4.

Michael Slater, "AMD's K5 Designed to Outrun Pentium," Microprocessor Report, vol. 8, No. 14, Oct. 24, 1994, 7 pages.

Sebastian Rupley and John Clyman, "P6: The Next Step?," PC Magazine, Sep. 12, 1995, 16 pages.

Tom R. Halfhill, "AMD K6 Takes on Intel P6," BYTE, Jan. 1996, 4 pages.

*Primary Examiner*—Parshotam S. Lall
*Assistant Examiner*—Patrice L. Hinder
*Attorney, Agent, or Firm*—Conley, Rose & Tayon, PC; B. Noel Kivlin; Lawrence J. Merkel

[57] ABSTRACT

A microprocessor is provided which is configured to locate memory and register operands regardless their use as an A operand or B operand in an instruction. Memory operands are conveyed upon a memory operand bus, and register operands are conveyed upon a register operand bus. Decoding of the source and destination status of the operands may be performed in parallel with the operand fetch. Restricting memory operands to a memory operand bus enables reduced bussing between decode units and the operand fetch unit. After fetching operand values from an operand storage, the operand fetch unit reorders the operand values according to the instruction determined by the associated decode unit. The operand values are thereby properly aligned for conveyance to the associated reservation station.

23 Claims, 4 Drawing Sheets

X86 Instruction Format

| Prefix 0-4 bytes 102 | Opcode 1-2 bytes 104 | Mod R/M 0-1 byte 106 | SIB 0-1 byte 108 | Displacement 0,1,2,or 4 bytes 110 | Immediate 0,1,2, or 4 bytes 112 |

FIG. 1A
(PRIOR ART)

MICROPROCESSOR CONFIGURED TO SWAP OPERANDS IN ORDER TO MINIMIZE DEPENDENCY CHECKING LOGIC

BACKGROUND OF THE INVENTION

1. Field of the Invention

This invention is related to the field of microprocessors and, more particularly, to operand fetching mechanisms within microprocessors.

2. Description of the Relevant Art

Superscalar microprocessors achieve high performance by simultaneously executing multiple instructions in a clock cycle and by specifying the shortest possible clock cycle consistent with the design. As used herein, the term "clock cycle" refers to an interval of time during which the pipeline stages of a microprocessor perform their intended functions. The resulting values are captured by memory elements (e.g. registers) according to a clock signal defining the clock cycle.

Due to the widespread acceptance of the x86 family of microprocessors, efforts have been undertaken by microprocessor manufacturers to develop superscalar microprocessors which execute x86 instructions. Such superscalar microprocessors achieve relatively high performance characteristics while advantageously maintaining backwards compatibility with the vast amount of existing software developed for previous microprocessor generations such as the 8086, 80286, 80386, and 80486.

The x86 instruction set is relatively complex and is characterized by a plurality of variable byte length instructions. A format illustrative of the x86 instruction set is shown in FIG. 1. As illustrated in the figure, an x86 instruction includes zero to four optional prefix bytes 102, followed by an operation code (opcode) field 104, an optional addressing mode (Mod R/M) byte 106, an optional scale-index-base (SIB) byte 108, an optional displacement field 110, and an optional immediate data field 112.

The opcode field 104 defines the basic operation for a particular instruction. The default operation of a particular opcode may be modified by one or more prefix bytes. For example, a prefix byte may be used to change the address or operand size for an instruction, to override the default segment used in memory addressing, or to instruct the processor to repeat a string operation a number of times. The opcode field 104 follows the prefix bytes 102, if any, and may be one or two bytes in length. The addressing mode (Mod R/M) byte 106 specifies the registers used as well as memory addressing modes. The scale-index-base (SIB) byte 108 is used only in 32-bit base-relative addressing using scale and index factors. A base field of the SIB byte specifies which register contains the base value for the address calculation, and an index field specifies which register contains the index value. A scale field specifies the power of two by which the index value will be multiplied before being added, along with any displacement, to the base value. The next instruction field is the optional displacement field 110, which may be from zero to four bytes in length. The displacement field 110 contains a constant used in address calculations. The optional immediate field 112, which may also be from zero to four bytes in length, contains a constant used as an instruction operand. The shortest x86 instructions are only one byte long, and comprise a single opcode byte. The 80286 sets a maximum length for an instruction at 10 bytes, while the 80386 and 80486 both allow instruction lengths of up to 15 bytes.

The complexity of the x86 instruction set poses difficulties in implementing high performance x86 compatible superscalar microprocessors. Particularly, decoding the instructions to determine the function required and the location of the operands may require a significant amount of the clock cycle time in the decode stage of the instruction processing pipeline. Instructions within the x86 instruction set may have up to two operands, and one of the operands may be a memory operand. The destination for the result of the instruction may be either operand, and may be referred to as the first operand of the instruction (or the "A" operand). The source operand is the second operand of the instruction (or the "B" operand). Operand fetch is typically performed in the decode stage, and requires a significant amount of the clock cycle time to access the operand storage (such as register files). As used herein, an "operand" of an instruction is indicative of the location of a value upon which the instruction is intended to operate. An operand may be a register operand indicative of which register stores the operand value, or a memory operand indicative of the address in memory storing the operand value. An "operand value" is the value upon which the instruction is intended to operate, or a tag which identifies the value. The tag may be used if the operand value is generated by a previous instruction which has yet to execute. The process of fetching operands includes determining the operands by decoding the instruction and transferring the operand value from the indicated storage location within the operand storage. The operand storage is a plurality of storage locations for storing operand values. A method for quickly generating operands for an instruction and performing operand fetch is desired.

SUMMARY OF THE INVENTION

The problems outlined above are in large part solved by a microprocessor configured in accordance with the present invention. The present microprocessor includes decode units configured to locate memory and register operands regardless their use as an A operand or B operand. Memory operands are conveyed upon a memory operand bus and register operands are conveyed upon a register operand bus to an operand fetch unit. Advantageously, operand fetch may begin prior to determining the source and destination status of the operands. Decoding of the source and destination status may be performed in parallel with the operand fetch. A shorter clock cycle may be enabled for the microprocessor by parallelizing these previously serial efforts.

Memory operands are often represented by significantly more bits then register operands. Therefore, restricting memory operands to a memory operand bus instead of allowing transfer upon either operand bus from decode units to an operand fetch unit may lead to reduced bussing than was previously achievable. Routing large busses through a microprocessor is often difficult and time-consuming, and so reduced bussing may lead to reduced effort in these areas. Furthermore, dependency checking hardware may be reduced by enabling the use of smaller comparator circuits (i.e. comparator circuits which compare fewer bits) with respect to the register operand bus.

After fetching operand values from an operand storage, the operand fetch unit reorders the operand values according to the instruction determined by the associated decode unit. The operand values are thereby properly aligned for conveyance to the associated reservation station.

Broadly speaking, the present invention contemplates a microprocessor comprising a decode unit and an operand fetch unit. A memory operand bus and a register operand bus are coupled between the decode unit and the operand fetch unit. Additionally coupled to the operand fetch unit are an operand A bus and an operand B bus. The decode unit is configured to convey a memory operand upon the memory operand bus and a register operand upon the register operand bus regardless of the order of the operands within an instruction. The operand fetch unit includes an operand storage coupled to the memory and register operand buses, wherein the operand storage is configured to store operand values and to fetch the operand values associated with the memory operand and the register operand. Further included within the operand fetch unit is a selection device coupled to the operand storage and to the operand A and B buses. The selection device is configured to reorder operand values associated with the memory operand and the register operand according to the instruction and to convey the operand values upon the operand A bus and the operand B bus.

The present invention further contemplates a method for handling memory and register operand fetching for an instruction comprising several steps. The instruction is decoded to determine if the instruction includes a memory operand. The memory operand is conveyed upon a memory operand bus to an operand fetch unit regardless of an order of operands within the instruction. A register operand from the instruction is conveyed upon a register operand bus to the operand fetching unit as well. Operand values are fetched by the operand fetch unit and reordered according to the instruction prior to executing the instruction.

BRIEF DESCRIPTION OF THE DRAWINGS

Other objects and advantages of the invention will become apparent upon reading the following detailed description and upon reference to the accompanying drawings in which:

FIG. 1 is a diagram of the x86 instruction format.

Figure 2:
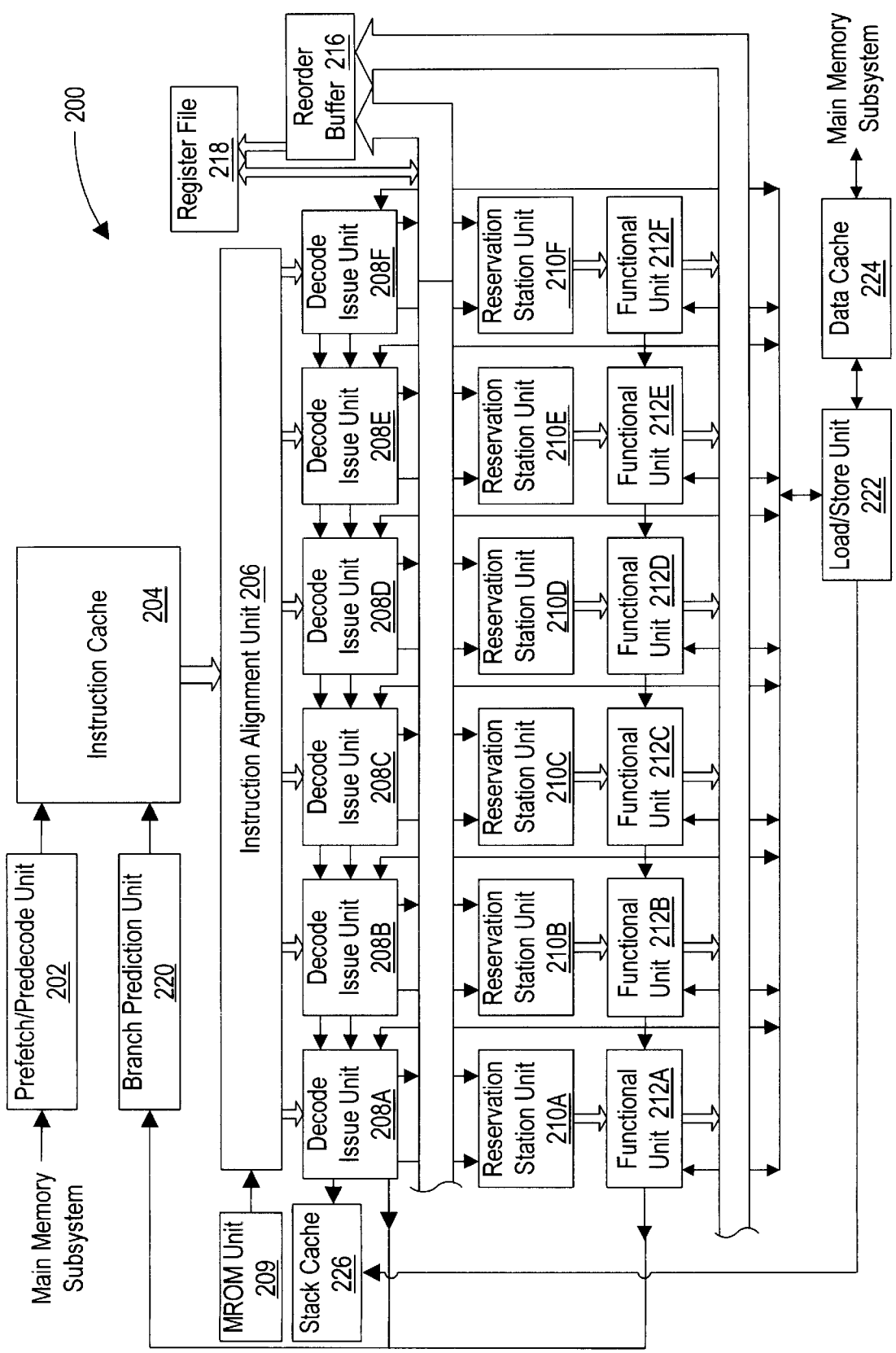
FIG. 2 is a block diagram of a superscalar microprocessor including a reorder buffer, stack cache, register file, decode units, and reservation stations.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 2, a block diagram of a superscalar microprocessor 200 including a stack cache 226, a reorder buffer 216, a register file 218, a plurality of decode units 208A–208F, and a plurality of reservation stations 210A–210F is shown. As illustrated in the embodiment of FIG. 2, superscalar microprocessor 200 includes a prefetch/predecode unit 202 and a branch prediction unit 220 coupled to an instruction cache 204. An instruction alignment unit 206 is coupled between instruction cache 204 and plurality of decode units 208A–208F (referred to collectively as decode units 208). Each decode unit 208A–208F is coupled to respective reservation station units 210A–210F (referred to collectively as reservation stations 210), and each reservation station 210A–210F is coupled to a respective functional unit 212A–212F (referred to collectively as functional units 212). Decode units 208, reservation stations 210, and functional units 212 are further coupled to a reorder buffer 216, a register file 218 and a load/store unit 222. A data cache 224 is shown coupled to load/store unit 222, and an MROM unit 209 is shown coupled to instruction alignment unit 206. Finally, stack cache 226 is coupled to load/store unit 222, decode units 208, data cache 224, and reorder buffer 216.

Generally speaking, instruction cache 204 is a high speed cache memory provided to temporarily store instructions prior to their dispatch to decode units 208. In one embodiment, instruction cache 204 is configured to cache up to 32 kilobytes of instruction code organized in lines of 16 bytes each (where each byte consists of 8 bits). During operation, instruction code is provided to instruction cache 204 by prefetching code from a main memory (not shown) through prefetch/predecode unit 202. It is noted that instruction cache 204 could be implemented in a set-associative, a fully-associative, or a direct-mapped configuration.

Prefetch/predecode unit 202 is provided to prefetch instruction code from the main memory for storage within instruction cache 204. In one embodiment, prefetch/predecode unit 202 is configured to burst 64-bit wide code from the main memory into instruction cache 204. It is understood that a variety of specific code prefetching techniques and algorithms may be employed by prefetch/predecode unit 202.

As prefetch/predecode unit 202 fetches instructions from the main memory, it generates three predecode bits associated with each byte of instruction code: a start bit, an end bit, and a "functional" bit. The predecode bits form tags indicative of the boundaries of each instruction. The predecode tags may also convey additional information such as whether a given instruction can be decoded directly by decode units 208 or whether the instruction must be executed by invoking a microcode procedure controlled by MROM unit 209, as will be described in greater detail below.

Table 1 indicates one encoding of the predecode tags. As indicated within the table, if a given byte is the first byte of an instruction, the start bit for that byte is set. If the byte is the last byte of an instruction, the end bit for that byte is set. If a particular instruction cannot be directly decoded by the decode units 208, the functional bit associated with the first byte of the instruction is set. On the other hand, if the instruction can be directly decoded by the decode units 208, the functional bit associated with the first byte of the instruction is cleared. The functional bit for the second byte of a particular instruction is cleared if the opcode is the first byte, and is set if the opcode is the second byte. It is noted that in situations where the opcode is the second byte, the first byte is a prefix byte. The functional bit values for instruction byte numbers 3–8 indicate whether the byte is a MODRM or an SIB byte, or whether the byte contains displacement or immediate data.

TABLE 1

Encoding of Start, End and Functional Bits

| Instr. Byte Number | Start Bit Value | End Bit Value | Functional Bit Value | Meaning |
|---|---|---|---|---|
| 1 | 1 | X | 0 | Fast decode |
| 1 | 1 | X | 1 | MROM instr. |
| 2 | 0 | X | 0 | Opcode is first byte |
| 2 | 0 | X | 1 | Opcode is this byte, first byte is prefix |
| 3–8 | 0 | X | 0 | Mod R/M or SIB byte |
| 3–9 | 0 | X | 1 | Displacement or immediate data; the second functional bit set in bytes 3–8 indicates immediate data |
| 1-8 | X | 0 | X | Not last byte of instruction |
| 1-8 | X | 1 | X | Last byte of instruction |

As stated previously, in one embodiment certain instructions within the x86 instruction set may be directly decoded by decode units 208. These instructions are referred to as "fast path" instructions. The remaining instructions of the x86 instruction set are referred to as "MROM instructions". MROM instructions are executed by invoking MROM unit 209. More specifically, when an MROM instruction is encountered, MROM unit 209 parses and serializes the instruction into a subset of defined fast path instructions to effectuate a desired operation.

Instruction alignment unit 206 is provided to channel variable byte length instructions from instruction cache 204 to fixed issue positions formed by decode units 208A–208F. In one embodiment, instruction alignment unit 206 independently and in parallel selects instructions from three groups of instruction bytes provided by instruction cache 204 and arranges these bytes into three groups of preliminary issue positions. Each group of issue positions is associated with one of the three groups of instruction bytes. The preliminary issue positions are then merged together to form the final issue positions, each of which is coupled to one of decode units 208.

Before proceeding with a detailed description of the operand decode and fetching mechanism formed by stack cache 226, reorder buffer 216, register file 218, decode units 208 and reservation stations 210, general aspects regarding other subsystems employed within the exemplary superscalar microprocessor 200 of FIG. 2 will be described. For the embodiment of FIG. 2, each of the decode units 208 includes decoding circuitry for decoding the predetermined fast path instructions referred to above. In addition, each decode unit 208A–208F routes displacement and immediate data to a corresponding reservation station unit 210A–210F. Output signals from the decode units 208 include bit-encoded execution instructions for the functional units 212 as well as operand address information, immediate data and/or displacement data.

Decode units 208 additionally detect "stack-relative" memory accesses. As used herein, a "stack-relative" memory access is a memory access utilizing an addressing mode which is indicative of a stack access (as defined in the x86 architecture, for example). In one embodiment, a stack-relative memory access is a memory access in which the address is formed using the value stored in the ESP or EBP registers of the x86 architecture along with a possible offset specified by the instruction. Decode units 208 are capable of generating a current ESP or EBP value even though some instructions prior to the instructions being decoded may not have executed yet. Exemplary hardware for this function is described in the commonly assigned, co-pending patent application entitled: "A Lookahead Register Value Generator and a Superscalar Microprocessor Employing the Same", Ser. No. 08/480,092 filed Jun. 7, 1995 by Pflum, now U.S. Pat. No. 5,768,610. The disclosure of this patent application is incorporated herein by reference in its entirety.

If a particular decode unit 208A–208F detects a stack-relative memory access, then that decode unit generates the address associated with the stack-relative memory access and conveys the address to stack cache 226. If the data exists within stack cache 226 and the memory access is a read, the data is transferred to the respective reservation station 210A–210F. Advantageously, stack-relative memory accesses occur in the decode stage of the instruction processing pipeline. A memory access may be a read access, in which bytes are transferred from memory to a destination specified by the instruction, or a write access, in which bytes are transferred from a source specified by the instruction to memory. The location in memory referenced by the access is determined by the access address associated with the access.

A "non-stack-relative" memory access is a memory access utilizing an addressing mode which is not indicative of a stack access. However, non-stack-relative memory accesses may access the stack. In the x86 architecture, for example, indirect addressing utilizing a register other than the ESP or EBP registers is a non-stack-relative memory access. As will be appreciated by those skilled in the art, indirect addressing is an addressing mode wherein the address is formed from the value stored in a register. In some cases, the address is formed by adding the value in the register to an offset provided with the instruction. The offset may be directly provided with the instruction, or indirectly through a register. The x86 architecture includes several registers, for example an EAX register, which may be used to provide the address of an operand via indirect addressing. If the EAX register specifies an address within the stack (as located by the ESP register), then a dependency may exist between the memory access specified by the EAX register and memory accesses generated from the ESP or EBP registers. Microprocessor 200 additionally classifies memory accesses having an address formed from the ESP or EBP registers and an indirect value stored in another register as non-stack-relative memory accesses. In one embodiment, decode units 208 are not configured to generate an address for a non-stack-relative memory access. Instead, these addresses are generated by functional units 212 during a subsequent clock cycle.

The superscalar microprocessor of FIG. 2 supports out of order execution, and thus employs reorder buffer 216 to keep track of the original program sequence for register read and write operations, to implement register renaming, to allow for speculative instruction execution and branch misprediction recovery, and to facilitate precise exceptions. As will be appreciated by those of skill in the art, a temporary storage location within reorder buffer 216 is reserved upon decode of an instruction that involves the update of a register to thereby store speculative register states. Reorder buffer 216 may be implemented in a first-in-first-out configuration wherein speculative results move to the "bottom" of the buffer as they are validated and written to the register file, thus making room for new entries at the "top" of the buffer. Other specific configurations of reorder buffer 216 are also possible. If a branch prediction is incorrect, the results of speculatively-executed instructions along the mispredicted path can be invalidated in the buffer before they are written to register file 218. As used herein, an instruction is speculatively-executed if the instruction is executed prior to determining that the execution is required by the sequential execution of the program. For example, if an instruction is fetched and executed in response to a predicted branch, the instruction is speculatively-executed until the branch prediction is validated. Additionally, an instruction which is subsequent to an instruction which may cause an exception is speculatively executed until the exception is known to occur or not occur.

The bit-encoded execution instructions and immediate data provided at the outputs of decode units 208A–208F are routed directly to respective reservation station units 210A–210F. In one embodiment, each reservation station unit 210A–210F is capable of holding instruction information (i.e., bit encoded execution bits as well as operand values, operand tags and/or immediate data) for up to three pending instructions awaiting issue to the corresponding functional unit. It is noted that for the embodiment of FIG. 2, each decode unit 208A–208F is associated with a dedicated reservation station unit 210A–210F, and that each reservation station unit 210A–210F is similarly associated with a dedicated functional unit 212A–212F. Accordingly, six dedicated "issue positions" are formed by decode units 208, reservation station units 210 and functional units 212. Instructions aligned and dispatched to issue position 0 through decode unit 208A are passed to reservation station unit 210A and subsequently to functional unit 212A for execution. Similarly, instructions aligned and dispatched to decode unit 208B are passed to reservation station unit 210B and into functional unit 212B, and so on.

It is noted that in one embodiment, the bit-encoded execution instructions comprise several one-hot encodings. A one-hot encoding includes values in which at most one bit of the value is set. For example, a one-hot encoding configured to assume eight different values is eight bits wide. Each one of the eight bits being set while the other seven bits are clear is indicative of a particular one of the eight values. Since no bits of a one-hot bit-encoded instruction are combined to determine the indicated instruction, the one-hot encoding may reduce the number of cascaded levels of logic used to perform the instruction within a functional unit 212. It is further noted that in one embodiment, the bit-encoded execution instructions are physically stored within the functional units 212.

Upon decode of a particular instruction, if a required operand is a register location, register address information is routed to reorder buffer 216 and register file 218 simultaneously. Those of skill in the art will appreciate that the x86 register file includes eight 32 bit real registers (i.e., typically referred to as EAX, EBX, ECX, EDX, EBP, ESI, EDI and ESP). Reorder buffer 216 contains temporary storage locations for results which change the contents of these registers to thereby allow out of order execution. A temporary storage location of reorder buffer 216 is reserved for each instruction which, upon decode, is determined to modify the contents of one of the real registers. Therefore, at various points during execution of a particular program, reorder buffer 216 may have one or more locations which contain the speculatively executed contents of a given register. If following decode of a given instruction it is determined that reorder buffer 216 has a previous location or locations assigned to a register used as an operand in the given instruction, the reorder buffer 216 forwards to the corresponding reservation station either: 1) the value in the most recently assigned location, or 2) a tag for the most recently assigned location if the value has not yet been produced by the functional unit that will eventually execute the previous instruction. If the reorder buffer has a location reserved for a given register, the operand value (or tag) is provided from reorder buffer 216 rather than from register file 218. If there is no location reserved for a required register in reorder buffer 216, the value is taken directly from register file 218. If the operand corresponds to a memory location, the operand value is provided to the reservation station unit through load/store unit 222 or stack cache 226.

Reorder buffer 216 is additionally responsible for completing stack-relative write accesses to stack cache 226. When an instruction which writes a stack memory location within stack cache 226 retires, reorder buffer 216 conveys the data bytes to be written to stack cache 226. An instruction "retires" when prior instructions have completed without causing an exception and the instruction's results are written to stack cache 226, data cache 224, or register file 218. If stack cache 226 is written to, it stores the data bytes in the appropriate storage location. During a later clock cycle, stack cache 226 may discard a cache line containing data bytes written in this fashion. At the time the data bytes are removed from stack cache 226, they are transferred to data cache 224.

Details regarding suitable reorder buffer implementations may be found within the publication "Superscalar Microprocessor Design" by Mike Johnson, Prentice-Hall, Englewood Cliffs, N.J., 1991, and within the co-pending, commonly assigned patent application entitled "High Performance Superscalar Microprocessor", Ser. No. 08/146,382, filed Oct. 29, 1993 by Witt, et al, abandoned. These documents are incorporated herein by reference in their entirety.

Reservation station units 210A–210F are provided to temporarily store instruction information to be speculatively executed by the corresponding functional units 212A–212F. As stated previously, each reservation station unit 210A–210F may store instruction information for up to three pending instructions. Each of the six reservation stations 210A–210F contain locations to store bit-encoded execution instructions to be speculatively executed by the corresponding functional unit and the values of operands. If a particular operand is not available, a tag for that operand is provided from reorder buffer 216 and is stored within the corresponding reservation station until the result has been generated (i.e., by completion of the execution of a previous instruction). It is noted that when an instruction is executed by one of the functional units 212A–212F, the result of that instruction is passed directly to any reservation station units 210A–210F that are waiting for that result at the same time the result is passed to update reorder buffer 216 (this technique is commonly referred to as "result forwarding"). Instructions are issued to functional units for execution after the values of any required operand(s) are made available. That is, if an operand associated with a pending instruction within one of the reservation station units 210A–210F has been tagged with a location of a previous result value within reorder buffer 216 which corresponds to an instruction which modifies the required operand, the instruction is not issued to the corresponding functional unit 212 until the operand result for the previous instruction has been obtained. Accordingly, the order in which instructions are executed may not be the same as the order of the original program instruction sequence. Reorder buffer 216 ensures that data coherency is maintained in situations where read-after-write dependencies occur.

In one embodiment, each of the functional units 212 is configured to perform integer arithmetic operations of addition and subtraction, as well as shifts, rotates, logical operations, and branch operations. It is noted that a floating point unit (not shown) may also be employed to accommodate floating point operations.

Each of the functional units 212 also provides information regarding the execution of conditional branch instructions to the branch prediction unit 220. If a branch prediction was incorrect, branch prediction unit 220 flushes instructions subsequent to the mispredicted branch that have entered the instruction processing pipeline, and causes prefetch/predecode unit 202 to fetch the required instructions from instruction cache 204 or main memory. It is noted that in such situations, results of instructions in the original program sequence which occur after the mispredicted branch instruction are discarded, including those which were speculatively executed and temporarily stored in load/store unit 222 and reorder buffer 216. Exemplary configurations of suitable branch prediction mechanisms are well known.

Results produced by functional units 212 are sent to the reorder buffer 216 if a register value is being updated, and to the load/store unit 222 if the contents of a memory location is changed. If the result is to be stored in a register, the reorder buffer 216 stores the result in the location reserved for the value of the register when the instruction was decoded. As stated previously, results are also broadcast to reservation station units 210A–210F where pending instructions may be waiting for the results of previous instruction executions to obtain the required operand values.

Generally speaking, load/store unit 222 provides an interface between functional units 212A–212F and data cache 224. In one embodiment, load/store unit 222 is configured with a load/store buffer with eight storage locations for data and address information for pending loads or stores. Decode units 208 arbitrate for access to load/store unit 222 in order to place non-stack-relative memory accesses as well as stack-relative memory accesses that may not be completed by stack cache 226 into the load/store buffer. When the buffer is full, a decode unit must wait until the load/store unit 222 has room for the pending load or store request information. Load/store unit 222 also performs dependency checking for load memory accesses against pending store memory accesses to ensure that data coherency is maintained.

Data cache 224 is a high speed cache memory provided to temporarily store data being transferred between load/store unit 222 and the main memory subsystem. In one embodiment, data cache 224 has a capacity of storing up to eight kilobytes of data. It is understood that data cache 224 may be implemented in a variety of specific memory configurations, including a set associative configuration.

Stack cache 226 is a high speed cache memory provided to temporarily store stack data (i.e. data associated with stack-relative memory accesses). In one embodiment, stack cache 226 is configured to store eight lines of 32 bytes each. It is understood that stack cache 226 may be implemented in a direct-mapped, set-associative, or fully associative configuration. Data stored within stack cache 226 may also be stored within data cache 224. When a stack-relative memory access is detected by a decode unit 208 and the associated data is not stored within stack cache 226, then the associated data is transferred to stack cache 226 from data cache 224. The stack-relative memory access which misses stack cache 226 is completed by load/store unit 222. Additionally, if the line being replaced within stack cache 226 contains data bytes that are the result of a write access, the replaced line is conveyed to data cache 224. It is noted that such a transfer may be accomplished similar to the disclosure of: "A Method for Transferring Data Between a Pair of Caches Configured to be Accessed from Different Stages of an Instruction Processing Pipeline" filed concurrently herewith by Tran, et al., Ser. No. 08/561,073, pending. The disclosure of this patent application is incorporated herein by reference in its entirety. Coherency between stack cache 226 and data cache 224 is maintained. Exemplary hardware for maintaining this coherency may be found in the commonly assigned, co-pending patent applications entitled: "A Reorder Buffer Capable of Detecting Dependencies Between Accesses to a Pair of Caches" by Tran Ser. No. 08/561,073, U.S. Pat. No. 5,765,035, and "A Dependency Checking Structure for a Pair of Caches Which are Accessed from Different Pipeline Stages of an Instruction Processing Pipeline" by Pflum, filed concurrently herewith. Ser. No. 08/561,033, pendings, the disclosures of these patent applications are incorporated herein by reference in their entirety.

Figure 3:
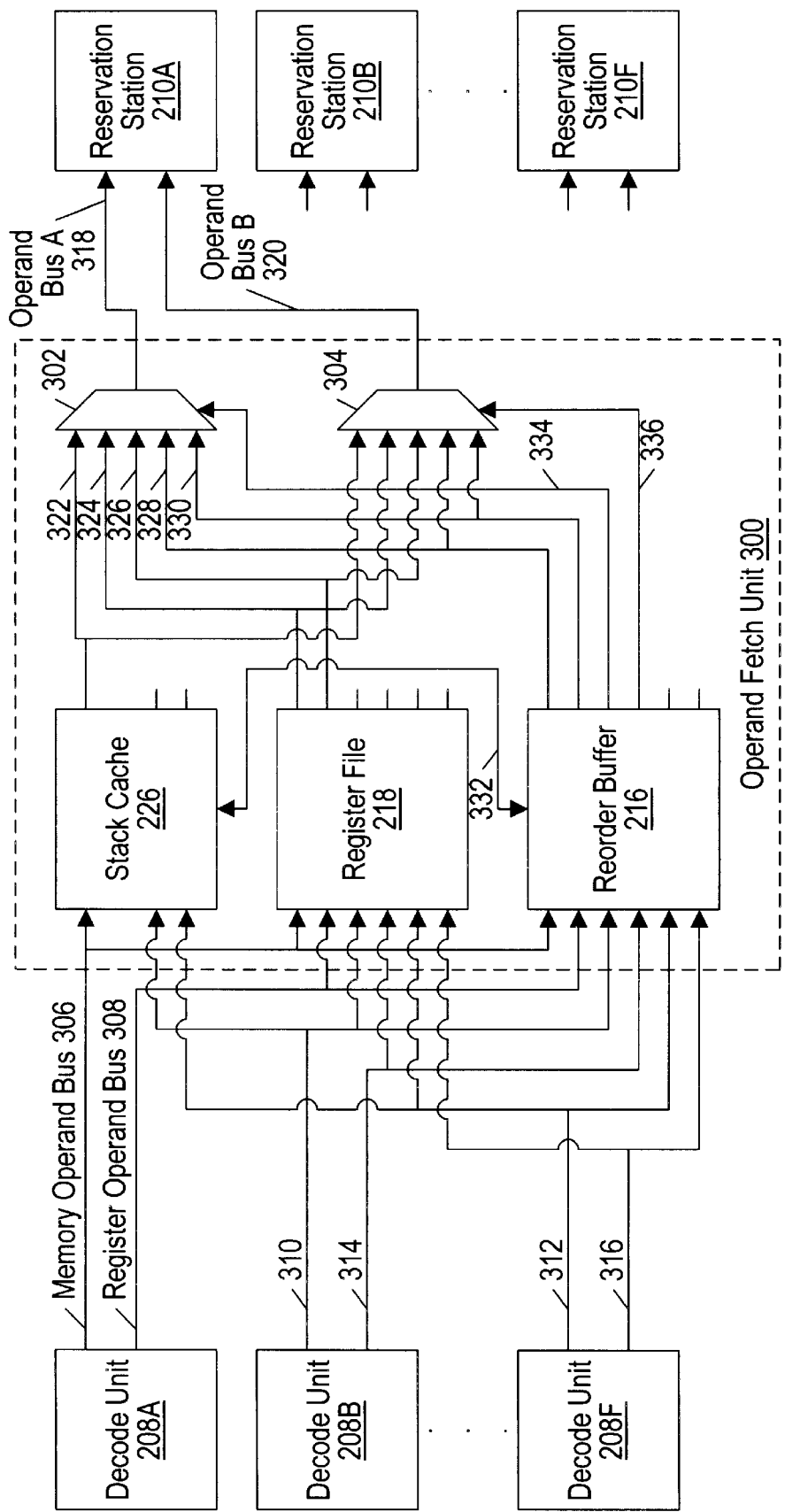
FIG. 3 is a block diagram of decode units, the reorder buffer, the stack cache, the register file, and the reservation stations of the microprocessor shown in FIG. 2, as well as a selection device. Also shown are the interconnections between these blocks.

Turning now to FIG. 3, a block diagram including decode units 208, an operand fetch unit 300, and reservation stations 210 is shown to highlight the interconnections between these blocks. For simplicity, only portions of these blocks pertaining to the present discussion are shown. In one embodiment, operand fetch unit 300 includes stack cache 226, register file 218, and reorder buffer 216. Additionally, operand fetch unit 300 includes a selection device for selecting between the output buses of stack cache 226, register file 218 and reorder buffer 216. In one embodiment, the selection device is a plurality of multiplexors. A pair of multiplexors 302 and 304 are shown in FIG. 3, indicative of the selection of operand values for reservation station 210A. Similar selection devices are employed for selecting operand values for reservation stations 210B–210F.

Generally speaking, decode units 208 are configured to identify the operands of an instruction utilizing a low number of cascaded levels of logic, and to convey these operands upon a pair of operand buses. Operand buses for decode unit 208A are shown as memory operand bus 306 and register operand bus 308 in FIG. 3. Buses 310 and 312 coupled to decode units 208B and 208F, respectively, are similar to memory operand bus 306. Buses 314 and 316 coupled to decode units 208B and 208F, respectively, are similar to register operand bus 308. Decode units 208C–208E are configured similarly. If decode unit 208A detects a memory operand, the memory operand is conveyed on memory operand bus 306. If decode unit 208A does not detect a memory operand, memory operand bus 306 may be used to convey a register operand. Register operand bus 308 conveys a register operand.

Operand fetch unit 300 receives the operands from decode units 208 and fetches the operand values from an operand storage. As used herein, an operand fetch unit refers to a unit configured to store and retrieve operand values. Operand fetch unit 300 conveys the retrieved operand values to a respective reservation station 210. Additionally, operand fetch unit 300 orders the operands according to which operand is the destination of the instruction. A pair of operand identifiers conveyed on memory operand bus 306 and register operand bus 308 (and similar buses from other decode units 208) indicate whether each operand is the first or the second operand of the instruction. Decoding the instruction to produce the operand identifiers may utilize a larger number of cascaded levels of logic than locating the operands. However, the operand identifiers are not used until later in the clock cycle than the operands. Coupled to each reservation station 210 is an operand A bus for conveying the first operand value and an operand B bus for conveying the second operand value. For example, reservation station 210 receives an operand A bus 318 and operand B bus 320 from operand fetch unit 300.

Advantageously, operand fetching may begin early in the clock cycle by allowing decode units 208 to locate the operands but not requiring that the operands be correctly ordered. For microprocessor 200's fast path instructions, decode units 208 may decode the memory and register operands by examining the Mod r/m byte (shown as reference number 106 in FIG. 1) and optionally the SIB byte (shown as reference number 108 in FIG. 1). The Mod r/m byte and SIB byte are located by the predecode bits, which also locate displacement and immediate data. Decode units 208 may then form an operand address for memory operands by adding the base register value to the displacement value and the resulting memory operand may be conveyed on the memory operand bus. Register addresses are located and conveyed on the register operand bus and/or the memory operand bus if no memory operand is detected. Further decoding then determines which operands are the first and second operands. The further decoding includes determining the type of instruction and the number of operands, and may be significantly more complex than locating the operands. Since the further decoding is performed in parallel with operand fetch, the clock cycle of the associated microprocessor may be shorter than a microprocessor which performs decode and operand fetch serially.

Additionally, since memory operands are conveyed on memory operand bus 306 but not on register operand bus 308, the bussing between decode units 208 and operand fetch unit 300 may be reduced. Memory operands utilize more bussing (since they comprise an address which may be, for example, 32 bits wide in one embodiment) than register operands (which comprise a value indicative of a particular register and may be, for example, six bits wide in one embodiment). Operand storage which is configured to store memory operands need not be connected to register operand bus 308. For example, stack cache 226 stores memory operands. Therefore, stack cache 226 is coupled to memory operand bus 306 and similar buses 310 and 312. However, stack cache 226 is not coupled to register operand bus 308 and similar buses 314 and 316.

Related to the reduced bussing is yet another advantage: hardware used to perform dependency checking between instructions may be reduced. Dependency checking is performed to ensure that the operand value intended to be used by an instruction is not being generated by an instruction currently within the instruction processing pipeline. Often, dependency checking involves utilizing comparator circuits to compare the operand to other operands within the instruction processing pipeline. According to one embodiment, thirty-two bit comparators are used to perform dependency checking upon memory operands while six bit comparators are used to perform dependency checking upon register operands. Since memory operands are conveyed only on memory operand buses, thirty-two bit comparators may be utilized with the memory operand buses and six bit comparators may be utilized with the register operand buses. Previously, a memory operand might be conveyed on either of the two operand buses emanating from a single decode unit. Therefore, thirty-two bit comparators were implemented for both sets of buses. The six bit comparators may occupy significantly less silicon area then the thirty-two bit comparators, and so silicon area is saved using the present operand fetching structure. It is noted that six bit comparators are used for register addresses because register file 218 includes more registers than the x86 architecture specifies. Other embodiments of register file 218 may employ different numbers of registers and hence different comparator sizes. Similarly, memory operands may be configured with different numbers of bits in different embodiments.

Another advantage of the present operand structure is that operands may be swapped when sent to reservation stations 210. This flexibility enables certain instructions to be executed as other instructions, simplifying the design of functional units 212. For example, the x86 architecture includes a subtract reverse instruction which subtracts the second operand from the first. The subtract instruction subtracts the first operand from the second. By swapping the operands of the instruction at the selection device of operand fetch unit 300, the subtract reverse instruction may be executed as the subtract instruction.

Associated with each memory operand bus attached to stack cache 226 is an output bus, such as output bus 322 associated with memory operand bus 306. Output bus 322 conveys the memory operand value addressed by the operand conveyed on memory operand bus 306. Output bus 322 is coupled as an input to the selection device formed by multiplexors 302 and 304.

Register operands may be conveyed on both buses. Reorder buffer 216 and register file 218 are therefore coupled to both memory operand bus 306 and register operand bus 308 (and similar buses from other decode units 208). Register file 218 is a register operand storage. Reorder buffer 216 provides temporary operand storage for both memory and register operands, and so receives both memory and register operand buses. Operand values associated with each input operand bus from decode unit 208A are conveyed to the selection device formed by multiplexors 302 and 304 upon output buses 324 and 326 (from register file 218) and output buses 328 and 330 (from reorder buffer 216). Output buses 324 and 328 are associated with memory operand bus 306; and output buses 326 and 330 are associated with register operand bus 308.

In the embodiment shown in FIG. 3, reorder buffer 216 receives the operand identifier information associated with operands conveyed upon operand buses from decode units 208. According to the operand identifier information and a stack cache hit indication conveyed on a stack cache hit conductor 332 from stack cache 226, reorder buffer 216 directs the selection device of operand fetch unit 300 to select from the operand values conveyed on output buses 322 through 330 to convey as operand values on operand A bus 318 and operand B bus 320. One of the operand values conveyed on output buses 322 through 330 is selected to be conveyed on operand A bus 318, and another of the operand values is selected to be conveyed on operand B bus 320. The selection information is conveyed on a pair of select signal buses 334 and 336 from reorder buffer 216 to multiplexors 302 and 304, respectively.

Figure 4:
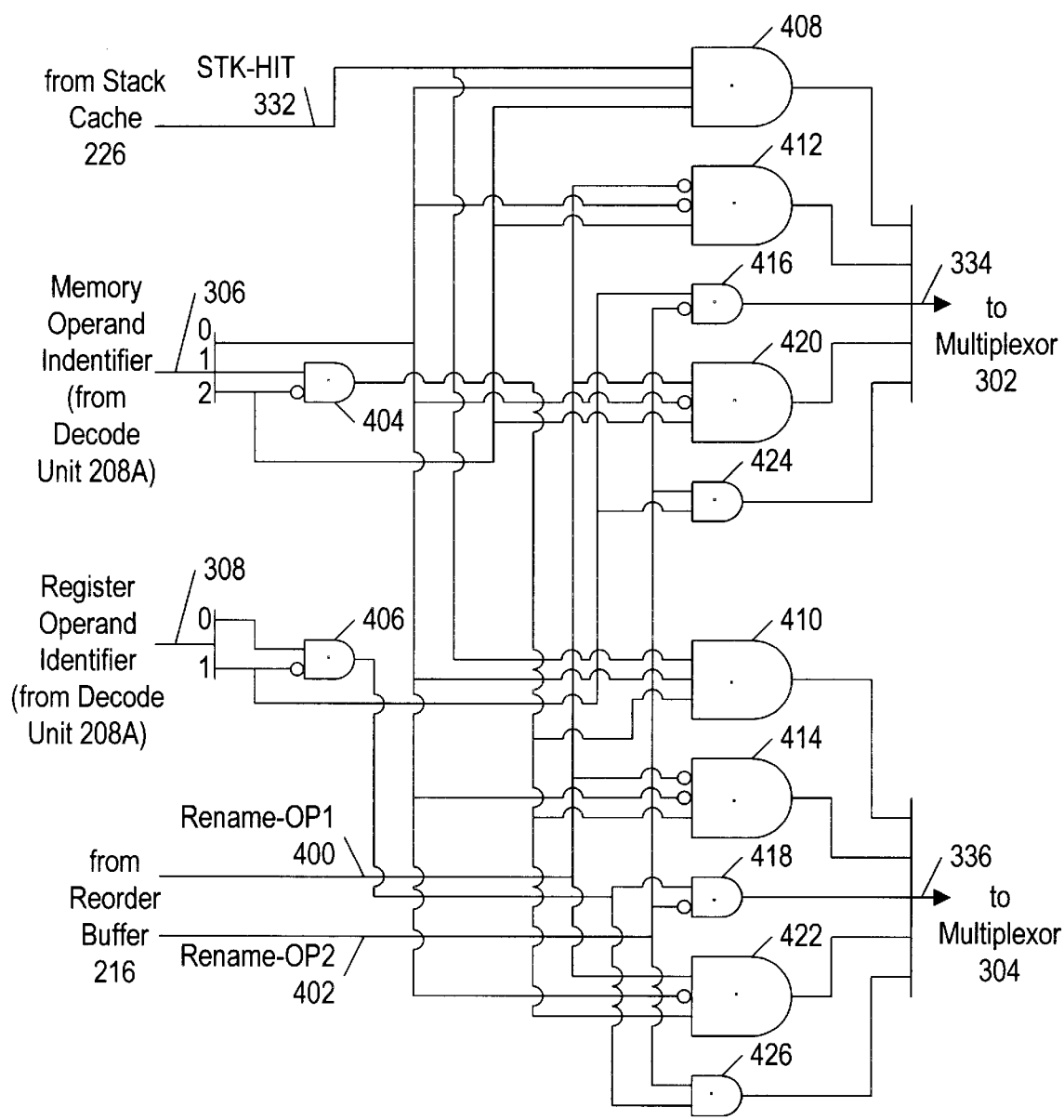
FIG. 4 is a logic diagram of the logic controlling the selection device shown in FIG. 3.

Turning now to FIG. 4, a logic diagram of exemplary logic circuits for creating the select signals conveyed upon select signal buses 334 and 336 is shown. The logic circuits receive the indication of a hit in stack cache 226 as well as the pair of operand identifiers conveyed on memory operand bus 306 and register operand bus 308. The operand identifier from memory operand bus 306 is referred to as the memory operand identifier; and the operand identifier from register operand bus 308 is referred to as the register operand identifier. Additionally, reorder buffer 216 indicates whether a register operand conveyed on memory operand bus 306 receives a rename value or tag via a rename signal upon rename operand one bus 400. Similarly, a register operand conveyed upon register operand bus 308 receiving a rename value is indicated by a signal upon rename operand two bus 402. If the associated rename signal is asserted, then a rename value is provided. If the associated rename signal is not asserted, then an actual value is provided. Rename values are provided by reorder buffer 216. Actual values are provided by register file 218 or stack cache 226.

In one embodiment, the register operand identifier comprises two bits interpreted as shown in Table 2 below:

TABLE 2

Register Operand Identifier Encoding

| Bits 0:1 | Meaning |
| --- | --- |
| 00 | bus is not used this clock cycle |
| 01 | bus conveys the A operand, and the A operand is the destination of the instruction |
| 11 | bus conveys the A operand, but the A operand is not the destination of the instruction |
| 10 | bus conveys the B operand, which is not the destination of the instruction |

The memory operand identifier comprises three bits, two of which are interpreted similar to the register operand identifier bits. The third bit of the memory operand identifier is indicative, when set, that memory operand bus 306 is conveying a memory operand during the current clock cycle. The third bit is indicative, when clear, that memory operand bus 306 is conveying a register operand during the current clock cycle.

As can be seen by examining Table 2, an operand is the A operand (or the first operand of the instruction) if the second of the two bits is set. An operand is the B operand (or the second operand of the instruction) if the two bits are set to a binary 10. FIG. 4 shows an exemplary logic diagram for implementing this encoding of the operand identifiers. Other encodings may be used in other embodiments, and different logic gates than those shown in FIG. 4 may be used with the present encoding.

AND gates 404 and 406 create signals indicating that the B operand is conveyed upon memory operand bus 306 and register operand bus 308, respectively. AND gate 408 identifies the memory operand value conveyed by stack cache 226 upon output bus 322 as the A operand by combining a signal indicative of a hit in stack cache 226 from stack cache hit conductor 332, the bit from the memory operand identifier indicative of a memory operand, and an indication that memory operand bus 306 is conveying the A operand. Similarly, AND gate 410 identifies the memory operand value conveyed by stack cache 226 as the B operand. AND gate 412 identifies the register operand value conveyed by register file 318 upon output bus 324 as the A operand by combining the rename signal from rename one conductor 400 being inactive (i.e. there is no rename, so the value in register file 218 is the most up to date value), the third bit of the memory operand identifier being inactive (i.e. memory operand bus 306 is conveying a register operand), and an indication that memory operand bus 306 is conveying the A operand. Similarly, AND gate 414 identifies the register operand value conveyed by register file 218 upon output bus 324 as the B operand. Similar to AND gate 412, AND gate 416 identifies the operand value conveyed by register file 218 upon output bus 326 as the A operand value and AND gate 418 identifies the operand value conveyed by register file 218 upon output bus 326 as the B operand value. Since AND gates 416 and 418 are decoding the register operand identifier, no indication that the operand value is a memory operand is needed.

AND gate 420 identifies the operand value conveyed by reorder buffer 216 upon output bus 328 as the A operand by combining the signal on rename one conductor 400 being active (i.e. a rename for the requested register operand is stored within reorder buffer 216), the third bit of the memory operand identifier being inactive (i.e. memory operand bus 306 is conveying a register operand), and an indication that memory operand bus 306 is conveying the A operand. Similarly, AND gate 422 identifies the operand value conveyed by reorder buffer 216 upon output bus 328 as the B operand. Similar to AND gates 420 and 422, AND gates 424 and 426 respectively identify the operand value conveyed by reorder buffer 216 upon output bus 330 as the A and the B operand.

Signals generated by AND gates 408, 412, 416, 420, and 424 form select signal bus 334 coupled to multiplexor 302. Hence, the A operand value associated with the instruction being decoded by decode unit 208A is conveyed to reservation station 210A. Similarly, signals generated AND gates 410, 414, 418, 422, and 426 form select signal bus 336 coupled to multiplexor 304. The B operand value associated with the instruction being decode by decode unit 208A is thereby conveyed to reservation station 210A.

It is noted that for cases in which the instruction being decode by a decode unit includes a memory operand but the decode unit is not capable of producing the address (i.e. the address is formed using registers other than the ESP or EBP registers), the instruction is treated as if it includes only register operands. The associated functional unit will cause the address to be calculated once the register operand values have been provided, and then load/store unit 222 will fetch the appropriate memory operand. It is further noted that the case of stack cache miss is treated similarly. The reorder buffer supplies the appropriate ESP or EBP value, and load/store unit 222 will fetch the appropriate memory operand. It is still further noted that, although the above description utilized the x86 microprocessor architecture as an example, any microprocessor architecture may benefit from the disclosure herein.

It is noted that other aspects regarding the implementation of linear addressed caches such as instruction cache 204, data cache 224, and stack cache 226 may be found within the commonly assigned, co-pending patent application entitled: "Linearly Addressable Microprocessor Cache", Ser. No. 08/146,381, filed Oct. 29, 1993 by Witt, abandoned. The disclosure of this patent application is incorporated herein by reference in its entirety.

It is noted that a superscalar microprocessor in accordance with the foregoing may further employ the latching structures as disclosed within the co-pending, commonly assigned patent application entitled "Conditional Latching Mechanism and Pipelined Microprocessor Employing the Same", Ser. No. 08/400,608 filed Mar. 8, 1995, by Pflum et al., abandoned. The disclosure of this patent application is incorporated herein by reference in its entirety.

It is further noted that aspects regarding array circuitry may be found in the co-pending, commonly assigned patent application entitled "High Performance Ram Array Circuit Employing Self-Time Clock Generator for Enabling Array Access", Ser. No. 08/473,103 filed Jun. 7, 1995 by Tran, now U.S. Pat. No. 5,619,464. The disclosure of this patent application is incorporated herein by reference in its entirety.

It is additionally noted that other aspects regarding superscalar microprocessors may be found in the co-pending, commonly assigned patent application entitled "Superscalar Microprocessor Including a High Performance Instruction Alignment Unit", Ser. No. 08/377,843, filed Jan. 25, 1995 by Witt, et al., abandoned. The disclosure of this patent application is incorporated herein by reference in its entirety.

An exemplary listing of fast path instructions for embodiments of microprocessor 200 employing the x86 microprocessor architecture is given in table 3 below:

TABLE 3

Exemplary Fast Path Instructions

| x86 Assembly | Fast Path/MROM |
| --- | --- |
| AAA | MROM |
| AAD | MROM |
| AAM | MROM |
| AAS | MROM |
| ADC | fast path |
| ADD | fast path |
| AND | fast path |
| ARPL | MROM |
| BOUND | MROM |
| BSF | fast path |
| BSR | fast path |
| BSWAP | MROM |
| BT | fast path |
| BTC | fast path |
| BTR | fast path |
| BTS | fast path |
| CALL | fast path |
| CBW | fast path |
| CWDE | fast path |
| CLC | fast path |
| CLD | fast path |
| CLI | MROM |
| CLTS | MROM |
| CMC | fast path |
| CMP | fast path |
| CMPS | MROM |
| CMPSB | MROM |
| CMPSW | MROM |
| CMPSD | MROM |
| CMPXCHG | MROM |
| CMPXCHG8B | MROM |
| CPUID | MROM |
| CWD | MROM |
| CWQ | MROM |
| DDA | MROM |
| DAS | MROM |
| DEC | fast path |
| DIV | MROM |
| ENTER | MROM |
| HLT | MROM |
| IDIV | MROM |
| IMUL | fast path |
| IN | MROM |
| INC | fast path |
| INS | MROM |
| INSB | MROM |
| INSW | MROM |
| INSD | MROM |
| INT | MROM |
| INTO | MROM |
| INVD | MROM |
| INVLPG | MROM |
| IRET | MROM |
| IRETD | MROM |
| Jcc | fast path |
| JCXZ | fast path |
| JECXZ | fast path |
| JMP | fast path |

TABLE 3-continued

Exemplary Fast Path Instructions

| x86 Assembly | Fast Path/MROM |
| --- | --- |
| LAHF | fast path |
| LAR | MROM |
| LDS | MROM |
| LES | MROM |
| LFS | MROM |
| LGS | MROM |
| LSS | MROM |
| LEA | fast path |
| LEAVE | fast path |
| LGDT | MROM |
| LIDT | MROM |
| LLDT | MROM |
| LMSW | MROM |
| LODS | MROM |
| LODSB | MROM |
| LODSW | MROM |
| LODSD | MROM |
| LOOP | fast path |
| LOOPcond | MROM |
| LSL | MROM |
| LTR | MROM |
| MOV | fast path |
| MOVCC | fast path |
| MOV CR | MROM |
| MOV DR | MROM |
| MOVS | MROM |
| MOVSB | MROM |
| MOVSW | MROM |
| MOVSD | MROM |
| MOVSX | fast path |
| MOVZX | fast path |
| MUL | fast path |
| NEG | fast path |
| NOP | not sent to functional unit |
| NOT | fast path |
| OR | fast path |
| OUT | MROM |
| OUTS | MROM |
| OUTSB | MROM |
| OUTSW | MROM |
| OUTSD | MROM |
| POP | fast path |
| POPA | MROM |
| POPAD | MROM |
| POPF | MROM |
| POPFD | MROM |
| PUSH | fast path |
| PUSHA | MROM |
| PUSHAD | MROM |
| PUSHF | fast path |
| PUSHFD | fast path |
| RCL | MROM |
| RCR | MROM |
| ROL | fast path |
| ROR | fast path |
| RDMSR | MROM |
| REP | MROM |
| REPE | MROM |
| REPZ | MROM |
| REPNE | MROM |
| REPNZ | MROM |
| RET | fast path |
| RSM | MROM |
| SAHF | fast path |
| SAL | fast path |
| SAR | fast path |
| SHL | fast path |
| SHR | fast path |
| SBB | fast path |
| SCAS | MROM |
| SCASB | MROM |
| SCASW | MROM |
| SCASD | MROM |
| SETcc | fast path |
| SGDT | MROM |

TABLE 3-continued

Exemplary Fast Path Instructions

| x86 Assembly | Fast Path/MROM |
|---|---|
| SIDT | MROM |
| SHLD | MROM |
| SHRD | MROM |
| SLDT | MROM |
| SMSW | MROM |
| STC | fast path |
| STD | fast path |
| STI | MROM |
| STOS | MROM |
| STOSB | MROM |
| STOSW | MROM |
| STOSD | MROM |
| STR | MROM |
| SUB | fast path |
| TEST | fast path |
| VERR | MROM |
| VERW | MROM |
| WBINVD | MROM |
| WRMSR | MROM |
| XADD | MROM |
| XCHG | MROM |
| XLAT | fast path |
| XLATB | fast path |
| XOR | fast path |

In accordance with the above disclosure, an operand fetching mechanism is presented. The operand fetching mechanism may enable increased frequency of operation and decreased silicon area for the associated microprocessor. Increased frequency may translate into increase performance, while decreased silicon area contributes to lower cost.

Numerous variations and modifications will become apparent to those skilled in the art once the above disclosure is fully appreciated. It is intended that the following claims be interpreted to embrace all such variations and modifications.

What is claimed is:

1. A microprocessor comprising:
   a memory operand bus configured to convey a memory operand;
   a register operand bus configured to convey a register operand;
   an operand A bus configured to convey a first operand value of an instruction;
   an operand B bus configured to convey a second operand value of an instruction;
   a decode unit coupled to said memory operand bus and to said register operand bus wherein said decode unit is configured to convey said memory operand upon said memory operand bus and said register operand upon said register operand bus regardless of an order of said operands within an instruction, wherein said memory operand and said register operand are simultaneously conveyed on said memory operand bus and said register operand bus, respectively;
   an operand fetch unit coupled to said memory operand bus, said register operand bus, said operand A bus, and said operand B bus, including:
      an operand storage coupled to said memory operand bus and said register operand bus wherein said operand storage is configured to store operand values and to fetch said operand values associated with said memory operand and said register operand; and
      a selection device coupled to said operand storage and to said operand A bus and said operand B bus wherein said selection device is configured to reorder said operand values associated with said memory operand and said register operand according to said instruction and to convey said operand values upon said operand A bus and said operand B bus.

2. The microprocessor as recited in claim 1 further comprising a reservation station coupled to said operand A bus, said operand B bus, and said decode unit wherein said reservation station is configured to store said instruction and said operand values.

3. The microprocessor as recited in claim 1 wherein said operand storage comprises a cache configured to store memory operand value wherein said cache is coupled to said memory operand bus.

4. The microprocessor as recited in claim 3 wherein said cache is a stack cache configured to store stack-relative memory operand values.

5. The microprocessor as recited in claim 1 wherein said operand storage comprises a register file configured to store register operand values, and wherein said register file is coupled to said memory operand bus and said register operand bus.

6. The microprocessor as recited in claim 1 wherein said operand storage comprises a reorder buffer configured to store speculative register and memory operand values, and wherein said reorder buffer is coupled to said memory operand bus and to said register operand bus.

7. The microprocessor as recited in claim 6 wherein said reorder buffer is configured to control said selection device according to said instruction.

8. The microprocessor as recited in claim 7 wherein said reorder buffer causes said selection device to convey said memory operand value upon said operand A bus if said instruction includes said memory operand as its first operand.

9. The microprocessor as recited in claim 7 wherein said reorder buffer causes said selection device to convey said memory operand value upon said operand B bus if said instruction includes said memory operand as its second operand.

10. The microprocessor as recited in claim 7 wherein said reorder buffer causes said selection device to convey said register operand value upon said operand A bus if said instruction includes said register operand as its first operand.

11. The microprocessor as recited in claim 7 wherein said reorder buffer causes said selection device to convey said register operand value upon said operand B bus if said instruction includes said register operand as its second operand.

12. The microprocessor as recited in claim 1 wherein said selection device is at least one multiplexor.

13. The microprocessor as recited in claim 1 wherein said memory operand bus is further configured to convey a second register operand if said instruction includes a pair of register operands.

14. The microprocessor as recited in claim 1 wherein said memory operand bus is further configured to convey a second register operand if said instruction excludes said memory operand.

15. The microprocessor as recited in claim 1 wherein said microprocessor is a superscalar microprocessor.

16. The microprocessor as recited in claim 15 wherein said microprocessor further comprises a plurality of said decode units, a plurality of said memory operand buses, and a plurality of said register operand buses, and wherein each of said plurality of decode units is coupled to a respective one of said plurality of memory operand buses and a respective one of said plurality of register operand buses.

17. The microprocessor as recited in claim 16 wherein said each of said plurality of said decode units is configured to decode said instruction and to convey said memory operand upon said respective one of said plurality of said memory operand buses and said register operand upon said respective one of said plurality of said register operand buses, and wherein said each of said plurality of said decode units is configured to convey said operands regardless of said order of said operands within said instruction.

18. The microprocessor as recited in claim 16 wherein said microprocessor further comprises a plurality of reservation stations configured to store instructions and operand values, wherein each of said plurality of reservation stations is coupled to a respective one of said decode units, and wherein each of said plurality of reservation stations is coupled to a respective one of a plurality of said operand A buses and a respective one of a plurality of said operand B buses.

19. The microprocessor as recited in claim 18 wherein said microprocessor further comprises a plurality of functional units configured to execute instructions, and wherein each of said plurality of functional units is coupled to a respective one of said plurality of reservation stations.

20. The microprocessor as recited in claim 16 wherein said microprocessor further comprises an instruction alignment unit coupled to said plurality of decode units wherein said instruction alignment unit is configured to align a plurality of instructions to said plurality of decode units.

21. A method for handling memory and register operand fetching for an instruction comprising:

decoding said instruction to determine if said instruction includes said memory operand;

conveying said memory operand upon a memory operand bus to an operand fetch unit regardless of an order of operands within said instruction;

conveying said register operand upon a register operand bus to said operand fetch unit regardless of said order of operands within said instruction wherein said register operand and said memory operand are conveyed simultaneously on said register operand bus and said memory operand bus, respectively;

fetching operand values from said operand fetch unit; and reordering said operand values according to said instruction prior to executing said instructions.

22. The method as recited in claim 21 further comprising conveying a second register operand upon said memory operand bus if said instruction includes a pair of register operands.

23. The method as recited in claim 21 further comprising conveying a second register operand upon said memory operand bus if said instruction excludes said memory operand.

* * * * *